United States Patent [19]

Matsubara et al.

[11] Patent Number: 4,902,111
[45] Date of Patent: Feb. 20, 1990

[54] METHOD AND DEVICE FOR DRIVING ELECTRO-OPTICAL LIGHT SHUTTER ARRAY

[75] Inventors: Ken Matsubara; Itaru Saito; Hirohisa Kitano; Kouichi Shingaki; Tomohiko Masuda, Osaka, all of Japan

[73] Assignee: Minolta Camera Kabushiki Kaisha, Osaka, Japan

[21] Appl. No.: 262,606

[22] Filed: Oct. 26, 1988

[30] Foreign Application Priority Data

Oct. 27, 1987 [JP] Japan ................................. 62-272377
Jan. 22, 1988 [JP] Japan ................................... 63-13224

[51] Int. Cl.⁴ ........................... G02F 1/01; G02F 1/03
[52] U.S. Cl. ..................................... 350/393; 350/392
[58] Field of Search ............... 350/355, 356, 374, 384, 350/385, 387, 392, 373

[56] References Cited

U.S. PATENT DOCUMENTS

| 3,577,097 | 5/1971 | Hillberg ............................ 350/393 X |
| 3,612,656 | 10/1971 | Maldonado et al. ............ 350/393 X |
| 3,806,228 | 4/1974 | Imagawa et al. .................... 350/150 |
| 3,806,897 | 4/1974 | Buchan et al. .................. 350/393 X |
| 4,154,505 | 5/1979 | Kato et al. ........................... 350/150 |
| 4,222,638 | 9/1980 | Robert ............................. 350/387 X |

FOREIGN PATENT DOCUMENTS 58-31315 2/1983 Japan.
60-103326 6/1985 Japan.
1534027 11/1978 United Kingdom.

Primary Examiner—Eugene R. LaRoche
Assistant Examiner—Nathan W. McCutcheon
Attorney, Agent, or Firm—Burns, Doane, Swecker & Mathis

[57] ABSTRACT

A driving device for a light shutter array having a plurality of serially aligned shutter elements each having an electro-optical effect to polarize an incident light by applying an electric field thereto. The device includes a plurality of individual electrodes each provided on a wall of a shutter element and a common electrode provided on an opposed wall of the shutter element. A driving pulse voltage is applied to the individual electrodes to activate the same according to recording data for turning ON/OFF the respective shutter elements in a first recording period and according to inverted recording data in a subsequent second recording period. The common electrode is grounded in the first recording period. A pulse voltage same as the driving pulse voltage is applied to the common electrode in the second recording period.

15 Claims, 11 Drawing Sheets

METHOD AND DEVICE FOR DRIVING ELECTRO-OPTICAL LIGHT SHUTTER ARRAY

BACKGROUND OF THE INVENTION

(1) FIELD OF THE INVENTION

The present invention relates to a driving method and a driving device for selectively driving some of a plurality of light shutter elements together constituting a light shutter array, each of the elements being formed of such material as PLZT having an electro-optical effect.

(2) DESCRIPTION OF THE PRIOR ART

A known light shutter array of the above-noted type using such material as PLZT having an electro-optical effect, comprises a polarizer and an analyzer which are respectively constituted by a polarizing plate and are disposed at a light incident side and at a light emitting side with polarizing angles thereof crossing at a right angle to each other. For a light transmission therethrough, a driving voltage is applied to electrodes disposed at opposed sides of the shutter array, such that the light incident to the shutter through the polarizer undergoes 90 degrees polarization in the shutter so as to be transmitted through the analyzer.

Further, in order to increase a transmission light intensity difference between the ON state and OFF state of the shutter, a half-wavelength voltage for polarizing the light by 90 degrees is employed as the shutter driving voltage applied between the electrodes in accordance with the 90 degree polarizing angle difference between the polarizer and the analyzer.

Then, the inventors of the present invention thought of using such a light shutter array including a plurality of serially aligned light shutter elements in an electrophotographic printer and have conducted intensive research on this application.

In using such a light shutter array in an electrophotographic printer, as shown in FIG. 1, a polarizer 101 and an analyzer 102 are disposed respectively at the light-incident side and at the light-emitting side across the light shutter array 10. A light from a light source lamp 103 and its reflecting mirror 104 is guided through the polarizer 101 to the shutter array 10, in which some light shutter elements are driven depending on the image information so as to permit selective transmission of this light through the analyzer 102. This light through the analyzer 102 is converged by a converging rod lens array 105 to be irradiated onto a periphery of a photosensitive member 107 uniformly charged by a corona charger 106, whereby an electrostatic latent image is formed on the periphery. Then, this latent image is developed through a developing device 108 into a toner image, which image is transferred through a transfer device 109 onto a copy sheet while removing excess toner remaining on the peripheral surface of the photosensitive member 107 by an eraser 110 and a cleaner 111.

In the above-described construction of the light shutter array employed in the electrophotographic printer, the respective shutter elements need to be selectively driven by pulses in order to form the electrostatic latent image on the photosensitive member being rotated at a predetermined peripheral speed.

Thus, the inventors conducted research on ambient temperature variations in a transmission light intensity Ip under the ON state of the shutter and a leakage light intensity Id under the OFF state of the same. As shown in FIG. 2, the research revealed that the transmission light intensity Ip is hardly affected by any ambient temperature variations whereas the leakage light intensity Id increases with a decrease in the temperature and further that this leakage light intensity Id under the OFF state of the shutter significantly increases as shown in FIG. 3 if the light shutter is driven at a temperature lower than the room temperature.

Moreover, the research revealed, as indicated by a broken line in FIG. 4, that the leakage light intensity also increases due to generation of polarization in the respective shutter elements if the shutter array is continuously driven by constantly applying a unidirectional pulsate electric field thereto even if the ambient temperature is maintained constant.

SUMMARY OF THE INVENTION

In a method of driving a light shutter array having a plurality of light shutter elements aligned in line, each of the elements having an electro-optical effect to polarize an incident light by applying an electric field thereto, the light shutter array including a plurality of individual electrodes each of which is provided on the walls of the respective elements and a common electrode provided on the opposite walls of the elements electrically in common so as to oppose the individual electrodes, the primary object of the present invention is to improve the above method, the improved method being capable of decreasing the leakage light amount from the light shutter at the OFF state of the same. A second object of the present invention is to provide a device for embodying this improved method.

In order to accomplish the primary object, a method according to the present invention comprises: a first step of applying a first pulse voltage to the individual electrodes of the light shutter elements to be activated according to data for turning ON/OFF the respective shutter elements at a periodical timing; and a second step of applying a second pulse voltage having a same polarity as the first pulse voltage to the common electrode in synchronism with completion of the pulsate application of the first pulse voltage in the first step.

In order to accomplish the second object, a device for a light shutter array having a plurality of light shutter elements aligned in line, each of the elements having an electro-optical effect to polarize an incident light by applying an electric field to polarize an incident light by applying an electric field thereto, comprises: a plurality of individual electrodes each of which is provided on the wall of the respective light shutter element; a common electrode which is provided on the opposed walls of the light shutter elements electrically in common so as to oppose to the individual electrodes; a first control circuit to which the individual electrodes are connected individually for applying a first pulse voltage thereto at a periodical timing according to data for turning ON/-OFF the respective light shutter elements; and a second control circuit connected to the common electrode for applying a second pulse voltage of a same polarity as the first pulse voltage thereto in synchronism with completion of application of the first pulse voltage by the first control circuit.

With the above-described light shutter driving system, after the first pulse acting as the driving pulse voltage is applied to the individual electrodes of the shutter, and then if the second voltage of the same polarity as the first pulse is applied to the common electrode of the shutter, the transmission light intensity through the light shutter sharply drops and the leakage light amount at the OFF state of the shutter also decreases advantageously.

Furthermore, if the second pulse of the same polarity as the first pulse is applied to the common electrode in synchronism with a negative edge of the first pulse, there is no necessity of switching over the pulse voltage to be applied to the respective shutter elements. As the result, the above-functions may be obtained by a simple circuit construction.

If the above-described light shutter array is employed in a recording device such as an electrophotographic printer, the light shutter driving device according to present invention essentially comprises a plurality of individual electrodes; a common electrode; recording means for applying a driving pulse voltage to the individual electrode to be activated according to the recording data for turning ON/OFF the respective light shutter elements in a recording operation; an alternating voltage source; and switching means for connecting the common electrode with the ground in the recording operation of the recording means and with the alternating voltage source after the recording operation.

With this construction, even at a low temperature operating condition, the response speed of the light shutter is significantly increased and also the image contrast between the ON state and OFF state of the shutter is enhanced whereby a high-quality image may be obtained.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Preferred embodiments of the present invention will be particularly described hereinafter with reference to the accompanying drawings.

In these embodiments (1) through (4), respective light shutter elements constituting a light shutter array are formed of PLZT which is an example of material having an electro-optical effect and has advantageous characteristics of quick response and relatively low voltage drivability.

EMBODIMENT (1)

Figure 5:
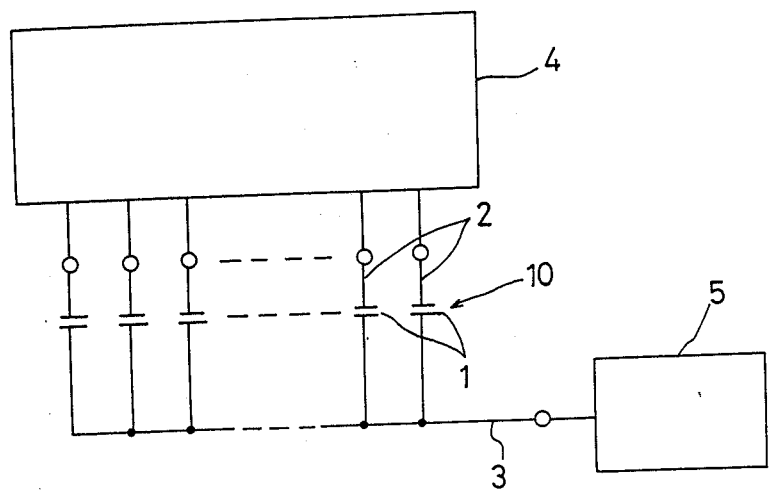
FIG. 5 is a circuit diagram illustrating a case where a common electrode of the light shutter array is connected to a bias driving circuit.

In this embodiment, shown in FIG. 5, the light shutter array 10 comprises the plurality of light shutter elements 11 each including a plurality of indivdual electrodes 2 of one polarity and a common electrode 3. The individual electrodes 2 are connected to a driving circuit 4 independently of each other while the common electrode 3 is connected to a bias driving circuit 5.

Figure 6:
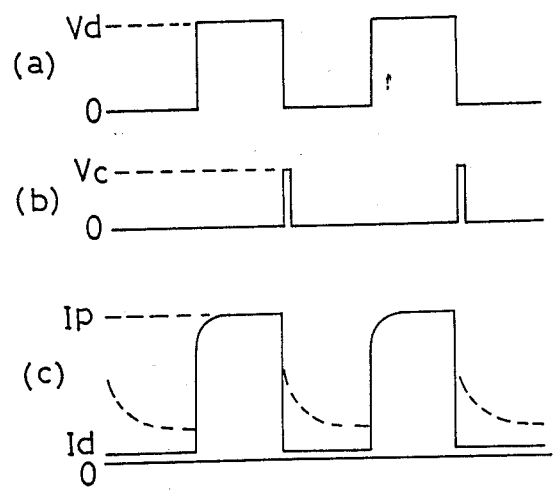
FIG. 6 is a timing chart illustrating a light shutter driving method according to one preferred embodiment of the present invention.

In operation, as shown in (a) and (b) of FIG. 6, after a driving pulse voltage Vd is applied from the driving circuit 4 to some of the individual electrodes 2 thereby driving the light shutter 1, in synchronism with a negative edge of this driving pulse voltage Vd, a pulse voltage Vc is applied from the bias driving circuit 5 to the common electrode 3 with the pulse voltage Vc having the same polarity as and a sufficiently shorter pulse width than the driving pulse voltage Vd. With this application of the voltage Vc, an electric field of the opposite direction to that in the shutter ON state acts on the light shutter elements 1. In the above-described shutter driving operation, it was observed, as shown in (c) of FIG. 7, that with the negative edge of the driving pulse voltage Vd the transmission light intensity Ip as indicated by a solid line sharply drops and the leakage light intensity Id under the OFF shutter state drops as well.

Figure 7:
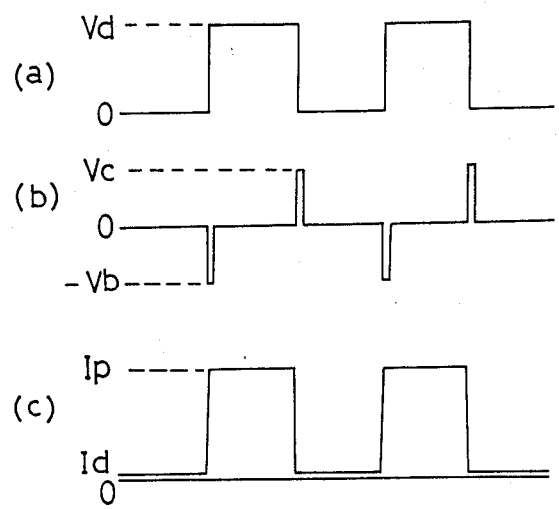
FIG. 7 is a timing chart illustrating a shutter driving method according to another embodiment of the present invention.

Next, in a modified arrangement of this embodiment 1 shown in FIG. 7, in synchronism with the application of the driving pulse voltage Vd to the individual electrodes 2 of the light shutter 1 and only at the initial stage of the driving operation, a nagative pulse voltage —Vb having a pulse width sufficiently shorter than the pulse voltage Vd is applied from the bias driving circuit 5 to the common electrodes 3. Thereafter, in the same manner as in the previous arrangement, in synchronism with a negative edge of the driving pulse voltage Vd, the drop-triggering pulse voltage Vc having the same polarity as and a sufficiently shorter pulse width than the voltage Vd is applied to the common electrode 3. In the light shutter driving operation according to this arrangement, it was observed, as shown in (c) of FIG. 7, that the rise of the transmission light intensity Ip at the initial stage of shutter driving operation is quickened and also that this transmission light intensity Ip sharply drops with a negative edge of the driving pulse voltage Vd and the leakage light intensity Id also drops.

Figure 8:
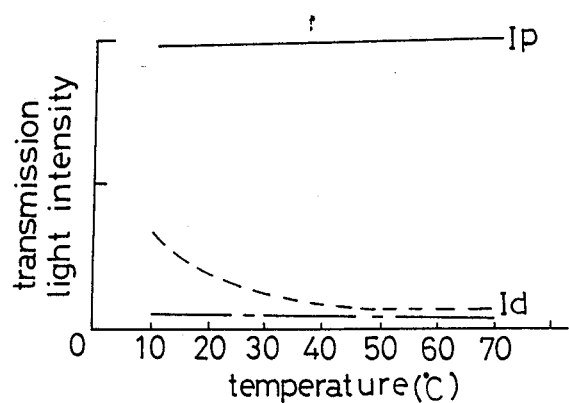
FIG. 8 is a graph illustrating variations in the leakage light intensity with ambient temperature when the light shutter is pulse-driven by the driving method of the embodiment.

Using the same arrangements as above, a further research was conducted on variations of the leakage light intensity with varying the shutter driving temperature. The research revealed the following. That is, in the embodiment (1), if the pulse voltage Vc having the same porality as and a sufficiently shorter pulse width than the driving pulse voltage Vd is applied to the common electrode 3 in synchronism with a negative edge of the voltage Vd, as indicated by an alternate long and short dash line in FIG. 8, there is observed a decrease in the leakage light intensity Id compared with the case indicated by a broken line with no application of the drop-triggering pulse voltage. In this case, it is also observed that the leakage light intensity Id does not increase and is constantly maintained at a low value even if the light shutter is driven at a low temperature.

EMBODIMENT (2)

Figure 9A:
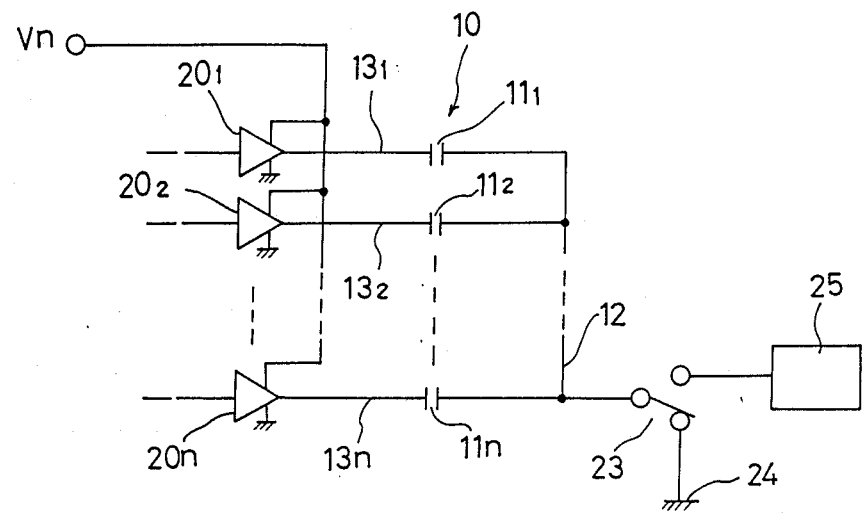
FIGS. 9A and 9B are circuit diagrams illustrating circuit switchover conditions in a recording time period and in a waiting time period of the light shutter array respectively.
Figure 9B:
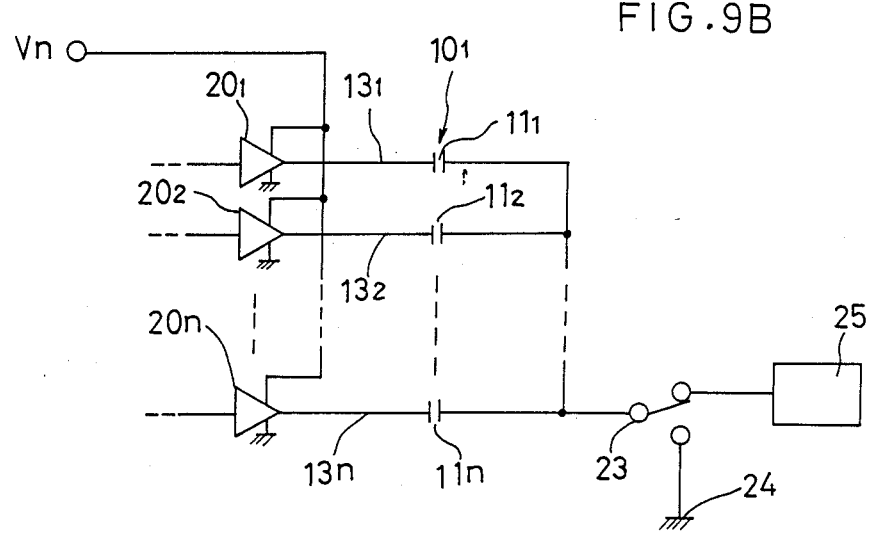

In this embodiment (2), as shown in FIGS. 9A and 9B, individual light shutter elements 11-1, 11-2, ... 11-n of the light shutter array 10 are connected to respective drivers 20-1, 20-2, ... 20-n independently of each other, whereas a common electrode 12 of the respective elements 11-1, 11-2, ... 11-n is connected to a selector switch 23, such that the common electrode 12 may be selectively connected with a ground (GND) 24 or with an alternating voltage generating circuit 25.

Figure 1:
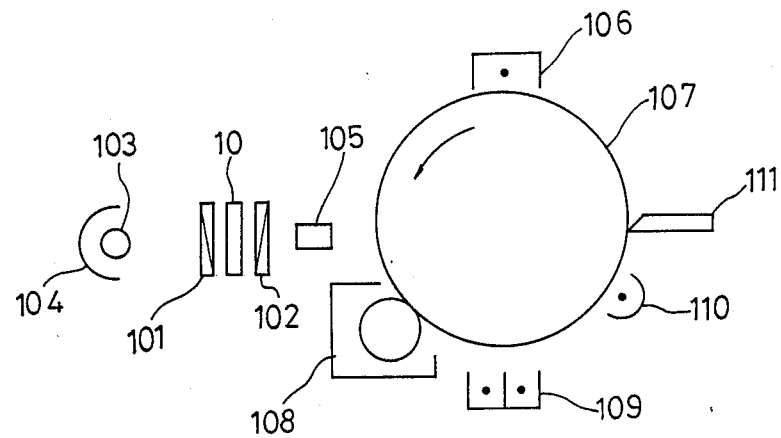
FIG. 1 is a schematic view illustrating a light shutter array employed as a recording device used in an electrophotographic printer.
Figure 2:
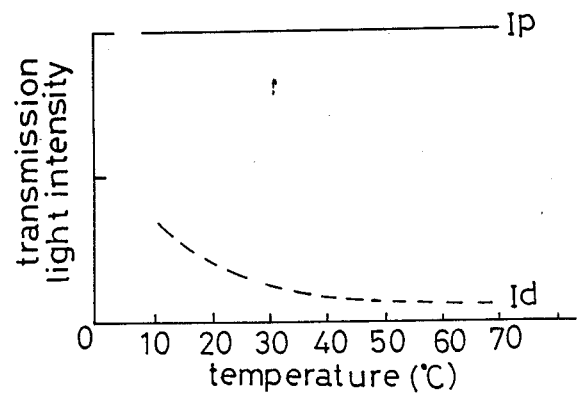
FIG. 2 is a graph illustrating variations of a transmission light intensity and a leakage light intensity with ambient temperature when the light shutter is pulse-driven.
Figure 3:
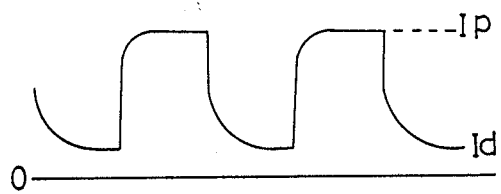
FIG. 3 is a graph illustrating variations in transmission light intensity when the light shutter is pulse-driven at a temperature lower than the room temperature.

For an image forming operation on the photosensitive member in the electrophotographic printer shown in FIG. 1 with using this light shutter array 10, as shown in FIG. 9A, the selector switch 23 is switched over to the GND 24 for connecting the common electrode 12 to the GND 24. Then, in accordance with object image information, the image data is transferred in parallel from the respective drivers 20-1, 20-2, ... 20-n to the light shutter elements 11-1, 11-2, ... 11-n thereby applying a driving voltage Vh only to individual electrodes 13-1, 13-2, ... 13-n of the selected light shutter elements 11. Then, the light transmitted through these selected shutter elements 11 is applied onto the periphery of the photosensitive member to record a latent copy image thereon.

Figure 10:
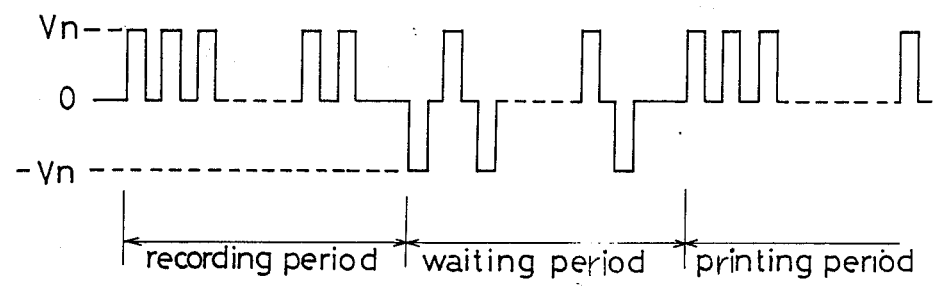
FIG. 10 is a timing chart illustrating states of driving pulse voltage to be applied to the light shutter in the recording time period and the waiting time period.

After the above image recording operation on the photosensitive member, while maintaining the GND connection of the individual electrodes 13-1, 13-2, ... 13-n of the shutter elements 11-1, 11-2, ... 11-n, the selector switch 23 is switched over from the GND 24 to the alternating voltage generating circuit 25 thereby connecting the common electrode 12 to the alternating voltage generating circuit 25. Then, as illustrated in a timing chart of FIG. 10, during a waiting time period, an alternating voltage + Vh is applied from the alternating voltage generating circuit 25 to the common electrode 12 for providing electric fields of different directions to the respective light shutter elements 11-1, 11-2, ... 11-n. Thereafter, the selector switch 23 is again switched over from the alternating voltage generating circuit 25 to the GND 24, and the shutter array 10 is driven for recording a copy image on the periphery of the photosensitive member in the same manner as in the previous arrangement.

Figure 4:
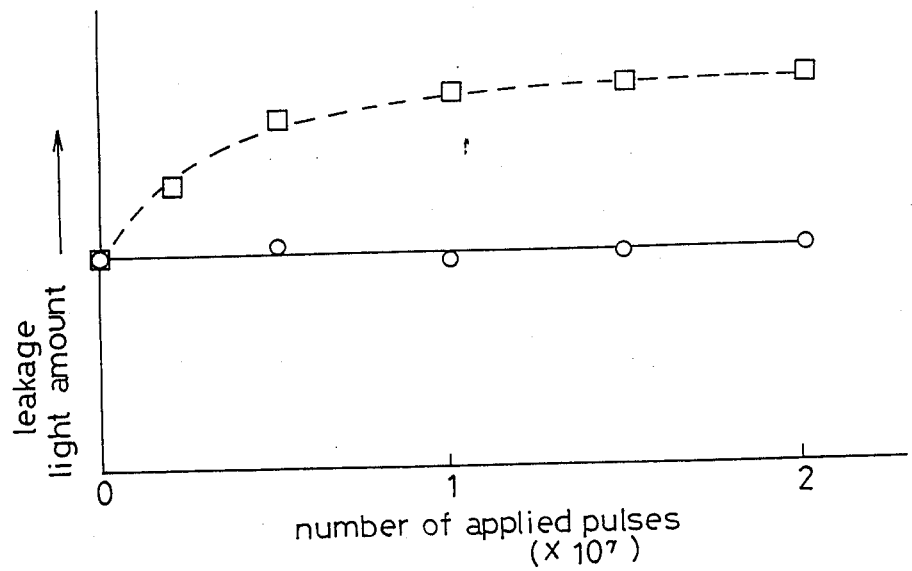
FIG. 4 is a graph illustrating the relationship between the number of driving pulse voltages applied to individual electrodes of the light shutter and the leakage light intensity at the OFF state of the shutter.

With the above-described arrangement for driving the shutter array 10 in which the alternating voltage + Vh is applied to the common electrode 12 during the waiting time period for applying the electric fields of different directions to the respective shutter elements 11-1, 11-2, ... 11-n, as indicated by the solid line in FIG. 4, the leakage light intensity is hardly changed and maintained at a low value even if the shutter array 10 is used repeatedly.

Incidentally, a square-wave alternating voltage + Vh is applied to the common electrode 12 during the waiting period in this embodiment. However, the wave shape of the voltage is not limited thereto but may be, e.g. a sine wave.

EMBODIMENT (3)

Figure 11:
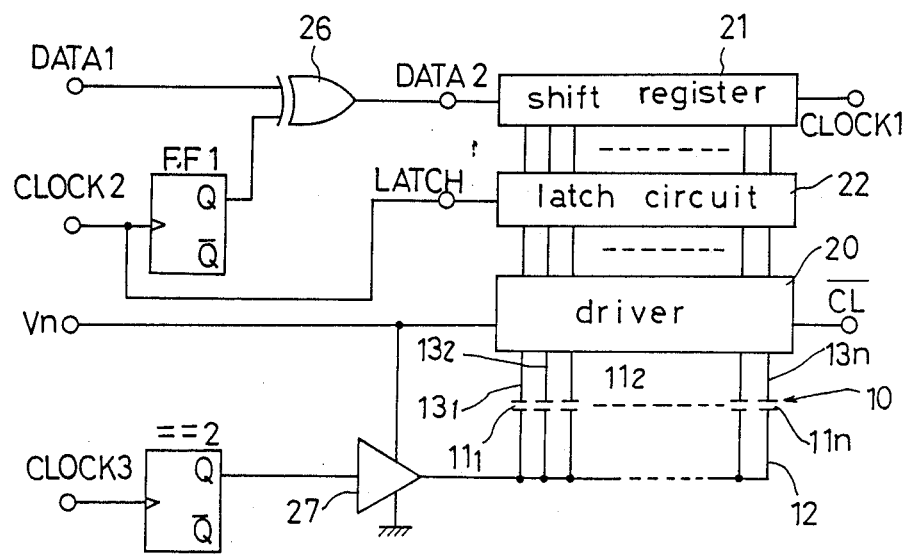
FIG. 11 is a block diagram of the circuitry for driving the light shutter array.

In this embodiment (3), as shown in a block circuit diagram of FIG. 11, there is provided a two-input XOR logic gate 26 for tranferring data to a shift register 21. This XOR gate 26 receives through one of its input terminals a first data DATA1 and through the other input terminal an output Q of a first flip-flop FF1 and outputs a second data DATA2 to be serially inputted to the shift register 21 in synchronism with a first clock signal CLOCK1.

The first flip-flop FF1 connected to the input terminal of the XOR gate 26 receives a second clock signal CLOCK2, in synchronism with which input the output Q of this flip-flop FF1 is toggled between 'HIGH' and 'LOW'. If this output Q is 'LOW', the XOR gate 26 outputs second data DATA2 of the same phase as the first data: DATA1. On the other hand, if the output Q is 'HIGH', the XOR gate 26 outputs second data DATA2 of the inverted phase of the first data DATA1.

After this, second data DATA2 of the same phase as or the inverted phase of the first data DATA1 is transferred to the shift register 21 in the previously described manner, and a latch circuit 22 latches the second data DATA2 in synchronism with a latch signal LATCH associated with the second clock signal CLOCK2. Then, by setting a driving signal CL to 'HIGH', the second data DATA2 latched at the latch circuit 22 is transferred in parallel from the driver 20 to the respective individual electrodes 13-1, 13-2, ... 13-n of the light shutter elements 11-1, 11-2, ... 11-n, thereby applying the voltage Vh only to these individual electrodes 13 of the selected shutter elements 11.

On the other hand, the common electrode 12 of the respective shutter elements 11-1, 11-2, ... 11-n is connected to a high-voltage driver 27 for generating the voltage Vh, with the driver 27 receiving an output Q of a second flip-flop FF2. This flip-flop FF2 receives a third clock signal CLOCK3, in synchronism with which input an output Q of this flip-flop FF2 is toggled between 'HIGH' and 'LOW'.

If the second data DATA2 transferred through the driver 20 is of the same phase as the first data DATA1, the output Q of the second flip-flop FF2 is set to 'LOW', such that the high-voltage driver 27 does not generate the voltage Vh and the common electrode 12 is connected with the GND 24. On the other hand, if the the second data DATA2 through the driver 20 is of the inverted phase of the first data DATA1, the output Q of the second flip-flop FF2 is set to 'HIGH', such that the high-voltage driver 27 generates and applies the voltage Vh to the common electrode 12.

Figure 12:
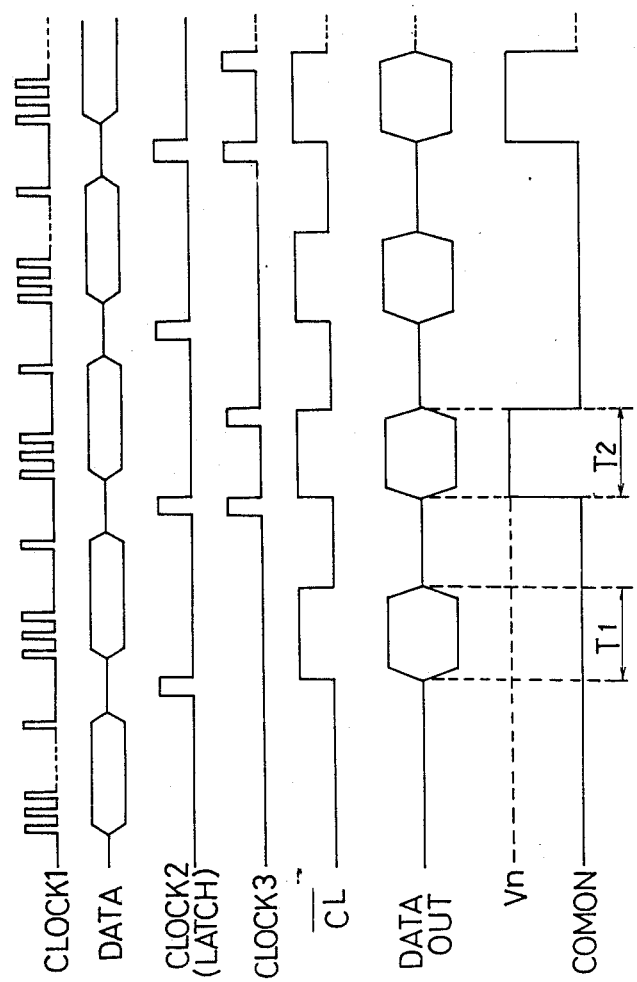
FIG. 12 is a timing chart for driving the light shutter array.
Figure 13A:
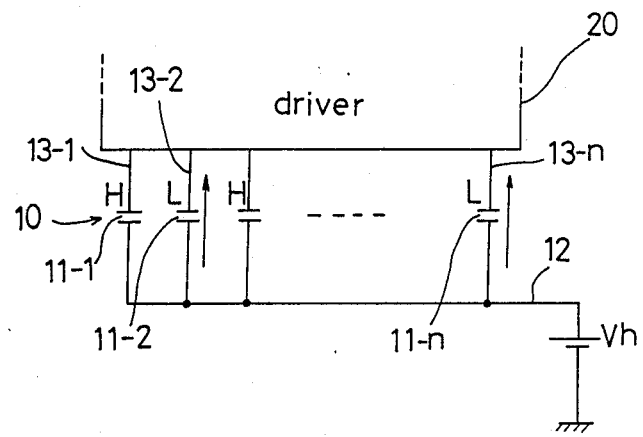
FIGS. 13A and 13B are views respectively showing driving conditions of the light shutter array in a time period T1 and in a time period T2 of the timing chart of FIG. 12, FIG. 14 and FIG. 15 are block diagrams of circuitry for driving the light shutter array according to a third embodiment.

As described above, if the second data DATA2 transferred through the driver 20 is of the same phase as the first data DATA1 and the common electrode 12 is connected with the GND 24, i.e. in a time period T1 shown in a timing chart of FIG. 12, only those shutter elements 11 whose individual electrodes 13 are provided with the voltage Vh in accordance with the second data DATA2 of the same phase as the first data: DATA1 are driven for transmitting the light therethrough as shown in FIG. 13A.

Figure 13B:
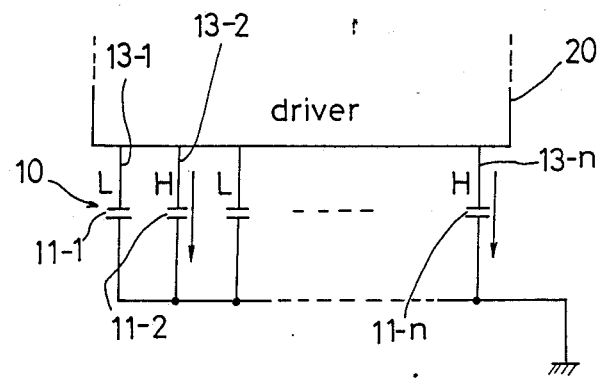

On the other hand, if the second data DATA2 transferred through the driver 20 is of the inverted phase of the first data and the voltage Vh is applied to the common electrode 12, i.e. in a time period T2 of the timing chart of FIG. 12, as shown in FIG. 13B, those shutter elements 11 whose individual electrodes 13 are provided with the voltage Vh in accordance with the second data DATA2 of the inverted phase are not driven since the voltage of the individual electrodes equate with that of the common electrode 12 applied with the voltage Vh. Reversely, those shutter elements 11 whose individual electrodes 13 are not applied with the voltage Vh are driven for transmitting the light therethrough.

Accordingly, in this time period T2 also, the same or equivalent image recording operation based on the first data DATA1 is effected.

If the light shutter array 10 is driven with the above-described arrangement, during the time periods T1 and T2, the electric fields of different directions act on the driven shutter elements 11. And, if this is effected repeatedly, the electric fields of different directions act more evenly on the respective light shutter elements 11.

Consequently, as in the foregoing embodiment (1), even if the light shutter array 11 is used repeatedly, the leakage light intensity during the OFF state of the elements 11 hardly changes and is maintained at a low value.

EMBODIMENT (4)

Figure 14:
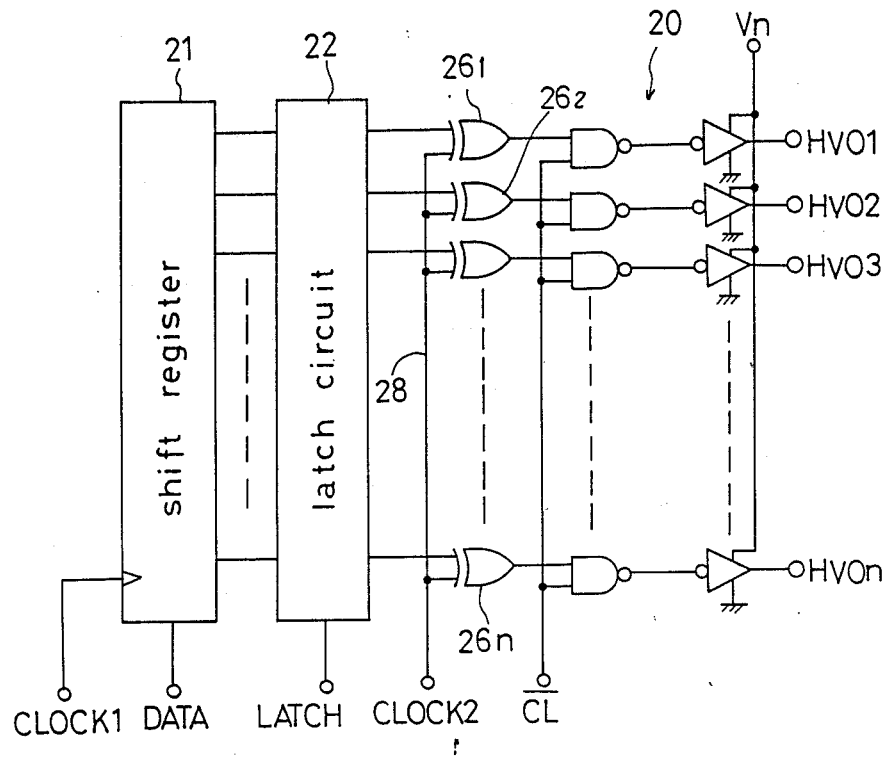
Figure 15:
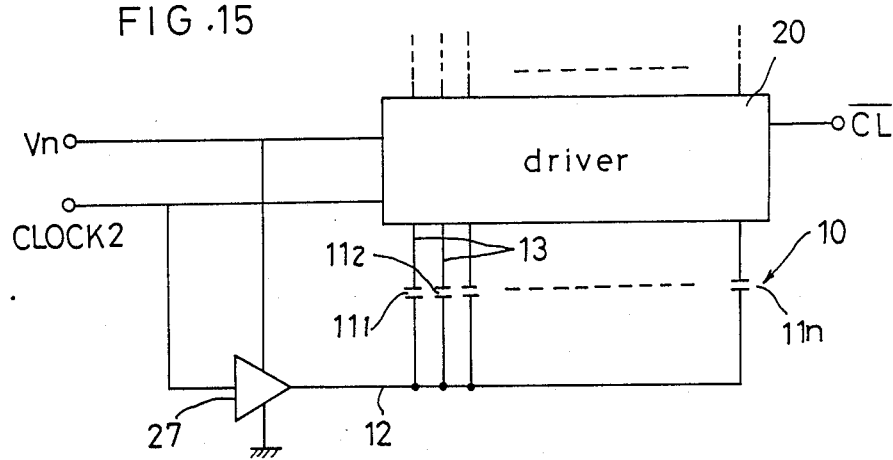

Referring now to block circuit diagrams of FIG. 14 and FIG. 15, in this embodiment (4) as in the previous embodiments, in the driver 20, DATA is serially inputted to the shift register 21 in synchronism with the first clock signal CLOCK1 and is latched at the latch circuit 22.

Then, in this particular embodiment, output terminals of the latch circuit 22 are respectively connected to one of input terminals of respective two-input XOR gates 26-1, 26-2, ... 26-n whereas the other input terminal of these respective gates is connected to a common line 28, through which the second clock signal CLOCK2 is transmitted.

If the second clock signal CLOCK2 is 'LOW', the input terminals connected to the common line 28 of the respective XOR gates 26-1, 26-2, ... 26-n are set to 'LOW', whereby the DATA transferred from the latch circuit 22 is outputted without being inverted from the output terminals of the respective XOR gates 26-1, 26-2, ... 26-n. On the other hand, if the second clock signal CLOCK2 is 'HIGH', the input terminals connected to the common line 28 of the respective XOR gates 26-1, 26-2, ... 26-n are set to 'HIGH', whereby the DATA transferred from the latch circuit 22 is inverted and outputted from the output terminals of the respective XOR gates 26-1, 26-2, ... 26-n.

Then, if the driving signal CL is set to 'HIGH', the output data of the same phase as or inverted phase of the DATA outputted from the output terminals of the XOR gates 26-1, 26-2, ... 26-n in synchronism with the second clock signal CLOCK2 as described above, is transferred directly, i.e. without its inversion from respective output terminals HVO1 through HVOn of the driver 20 thereby applying the voltage Vh to the individual electrodes 13 of the selected shutter elements 11. Incidentally, if the driving signal CL is 'LOW', all of the output terminals HVO1 through HVOn of the driver 20 are disabled.

Further, as shown in FIG. 15, the common electrode 12 of the respective light shutter elements 11-1, 11-2, ... 11-n is connected to the high-voltage driver 27 for generating the voltage Vh, with the driver 27 being adapted to receive the second clock signal CLOCK2.

Figure 16:
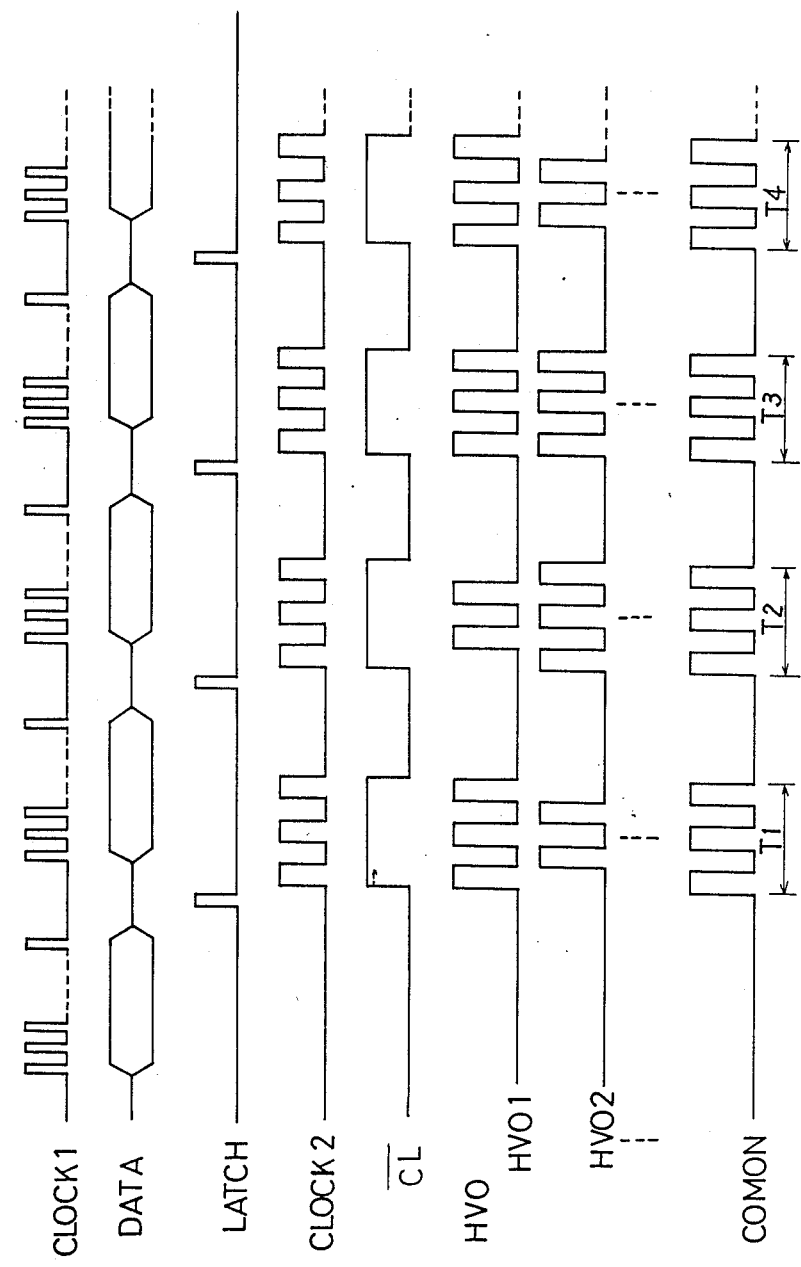
FIG. 16 is a timing chart for driving the light shutter array.

Then, as illustrated in a timing chart of FIG. 16, if this second clock signal CLOCK2 is 'LOW' and the DATA from the latch circuit 22 is transferred directly from the respective output terminals HVO1 through HVOn of the driver 20, the high-voltage driver 27 does not generate the voltage Vh and the common electrode 12 is connected to the GND 24, whereby only those light shutter elements 11 whose individual electrodes 13 are applied with the voltage Vh are driven for transmitting the light therethrough.

On the other hand, if the second clock signal CLOCK2 is 'HIGH' and the DATA from the latch circuit 22 is outputted with inversion from the respective output terminals HVO1 through HVOn of the driver 20, the high-voltage driver 27 applies the voltage Vh to the common electrode 12, whereby those shutter elements 11 whose individual electrodes 13 are applied with the voltage Vh are not driven since the voltage equates with that of the common electrode 12 whereas those shutter elements 11 whose individual electrodes 13 are not applied with the voltage Vh are driven by the voltage Vh applied to the common electrode 12 for transmitting the light therethough. Consequently, in this case also, the image recording operation is effected based on the DATA from the latch circuit 22.

Figure 17:
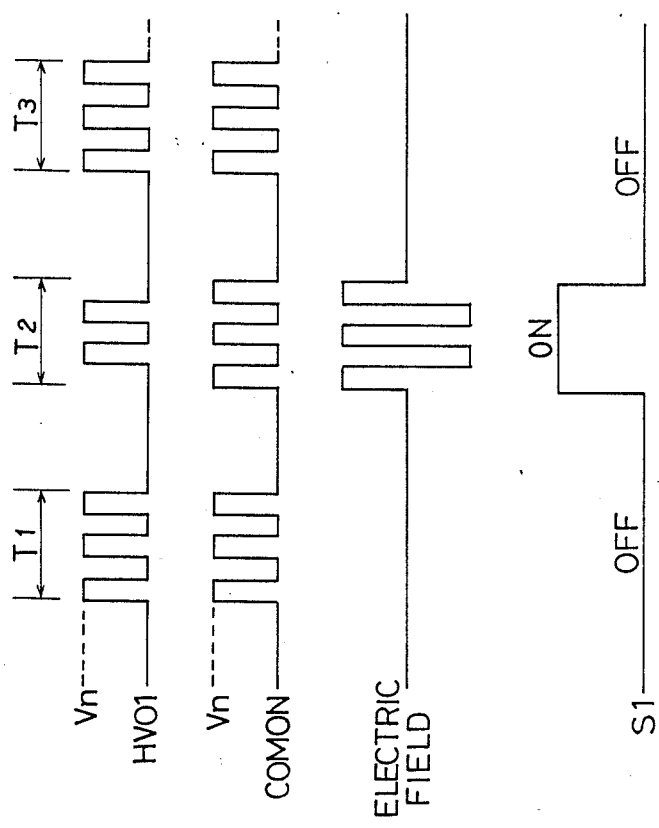
FIG. 17 is a timing chart illustrating the driving conditions of the light shutter by way of example of an output terminal HVO1 of a driver.

The above operation will be more particularly described by taking one output terminal HVO1 of the driver 20 for example. As illustrated in a timing chart of FIG. 17, during a time period T1, the application of the voltage Vh from the output terminal HVO1 to the individual electrode 13 synchronizes with the application of the voltage Vh to the common electrode 12. For this reason, during the time period T1, the voltages across these electrodes 12 and 13 of the shutter element 11 equate with each other and this shutter element 11 is not driven. On the other hand, during a time period T2, the timing of the application of the voltage Vh from the output terminal HVO1 to the individual electrode 13 is opposite in phase to that of the application of the voltage Vh to the common electrode 12. Accordingly, the voltage Vh is applied to the light shutter element 11 for driving the same while its electric field is inverted in synchronism with the second clock signal CLOCK2.

In operation of the light shutter array 10 having the above-described arrangement, if the driving signal CL is 'HIGH', an electric field of different direction acts on the driven light shutter element 11 in synchronism with the second clock signal CLOCK2, and if this operation is repeated based on the DATA, the application of the electric field of different direction acts evenly to some extent on the respective light shutter elements 11.

Consequently, in this embodiment (4) also, even if the light shutter array 10 is repeatedly used, the leakage light intensity at the OFF state of the respective shutter elements 11 hardly changes and is maintained at a low value.

What is claimed is:

1. A method of driving a light shutter array having a plurality of light shutter elements aligned in line, each of the light shutter elements having an electro-optical effect to polarize an incident light by applying an electric field thereto, the light shutter array including a plurality of individual electrodes each of which is provided on the wall of the respective light shutter elements and a common electrode provided on the opposite walls of the light shutter elements electrically in common so as to oppose the individual electrodes, the method comprising:

a first step of applying a first pulse voltage to the individual electrodes of the light shutter elements to be activated according to data for turning ON/-OFF the respective light shutter elements at a periodical timing; and a second step of applying a second pulse voltage having the same polarity as said first pulse voltage to said common electrode in synchronism with completion of the pulsate application of said first pulse voltage in the first step.

2. A method as claimed in claim 1, wherein said common electrode is connected with the ground during said first step.

3. A method as claimed in claim 1, wherein said second pulse voltage has a pluse width short in relation to that of said first pulse voltage.

4. A method as claimed in claim 3, further comprising a third step of applying a third pulse voltage, which has a polarity opposite to that of said first pulse voltage and a pulse width short in relation to that of said first pulse voltage, to said common electrode in synchronism with the start of said pulsate application of the first pulse voltage in said first step.

5. A driving device for a light shutter array having a plurality of light shutter elements aligned in line, each of the light shutter elements having an electro-optical effect to polarize an incident light by applying an electric field thereto, the device comprising:

a plurality of individual electrodes each of which is provided on the wall of the respective light shutter elements;

a common electrode which is provided on the opposite walls of the light shutter elements electrically in common so as to oppose said individual electrodes;

a first control circuit to which said individual electrodes are connected individually for applying a first pulse voltage thereto at a periodical timing according to data for turning ON/OFF said respective light shutter elements; and a second control circuit connected to said common electrode for applying a second pulse voltage of the same polarity as that of said first pulse voltage thereto in synchronism with completion of application of said first pulse voltage by said first control circuit.

6. A driving device as claimed in claim 5, wherein said second pulse voltage has a pulse width short in relation to that of said first pulse voltage.

7. A driving device as claimed in claim 6, wherein said second control circuit further applies a third pulse voltage, which has a polarity opposite to that of said first pulse voltage and a pulse width which is short in relation to that of said first pulse voltage, to said common electrode in synchronism with the start of application of said first pulse voltage by said first control circuit.

8. A method of driving a light shutter array having a plurality of light shutter elements aligned in line, each of the light shutter elements having an electro-optical effect to polarize an incident light by applying an electric field thereto, the light shutter array modulating the incident light according to recording data and transmitting the modulated light to a photosensitive member, the method comprising:

recording steps of applying an electric field with a pulse shape to the light shutter elements to be activated according to the recording data for modulating the incident light; and a step of applying an alternating electric field to said light shutter elements between said recording steps.

9. A driving device for a light shutter array having a plurality of light shutter elements aligned in line, each of the light shutter elements having an electro-optical effect to polarize an incident light by applying an electric field thereto, the light shutter array modulating the incident light according to recording data and transmitting the modulated light to a photosensitive member, the device comprising:

a plurality of individual electrodes each of which is provided on the wall of the respective light shutter elements;

a common electrode which is provided on the opposite walls of the light shutter elements electrically in common so as to oppose the individual electrodes;

recording means for applying a driving pulse voltage to the individual electrode to be activated according to the recording data for turning ON/OFF the respective light shutter element in a recording operation;

an alternating voltage source; and switching means for connecting said common electrode with ground in the recording operation of the recording means and with said alternating voltage source after the recording operation.

10. A method of driving a light shutter array having a plurality of light shutter elements aligned in line, each of the light shutter elements having an electro-optical effect to polarize an incident light by applying an electric field thereto, the light shutter array modulating the incident light according to recording data and transmitting the modulated light to a photosensitive member and including a plurality of individual electrodes each of which is provided on the wall of the respective light shutter element and a common electrode provided on the opposite walls of the light shutter elements electrically in common so as to oppose the individual electrodes, the method comprising:

a first step of applying a driving voltage with a pulse shape to the individual electrodes of the light shutter elements to be activated according to the recording data for turning ON/OFF the respective light shutter elements while grounding the common electrode; and a second step of applying the driving voltage with a pulse shape to the individual electrodes of the light shutter elements to be activated according to the inverted data of the recording data while applying a same voltage as the driving voltage to the common electrode;

wherein said first and second steps are alternately repeated.

11. A method as claimed in claim 10, wherein said first and second steps are alternately repeated according to recording line by line.

12. A method as claimed in claim 10, wherein said first and second steps are alternately repeated according to recording page by page.

13. A driving device for a light shutter array having a plurality of light shutter elements aligned in line, each of the light shutter elements having an electro-optical effect to polarize an incident light by applying an electric field thereto, the device comprising:
- a plurality of individual electrodes each of which is provided on the wall of the respective light shutter element;
- a common electrode which is provided on the opposite walls of the light shutter elements electrically in common so as to oppose to the individual electrodes;
- means for applying a driving voltage with a pulse shape to the individual electrodes of the light shutter elements to be activated according to the recording data for turning ON/OFF the respective light shutter elements in a first recording period and according to the inverted data of the recording data in a second recording period following the first recording period; and
- means for grounding the common electrode in the first recording period and for applying a same voltage as the driving voltage to the common electrode in the second recording period.

14. A driving device as claimed in claim 13, wherein each of said first and second recording periods is a recording period according to one-line recording.

15. A driving device as claimed in claim 13, wherein each of said first and second recording periods is a recording period according to one-page recording.

* * * * *